United States Patent [19]
Mausteller et al.

[11] 3,938,512
[45] Feb. 17, 1976

[54] EMERGENCY BREATHING APPARATUS

[75] Inventors: John W. Mausteller, Evans City; Miles J. McGoff, Warrendale; Daniel L. Thiebaud, Zelienople, all of Pa.

[73] Assignee: Mine Safety Appliances Company, Pittsburgh, Pa.

[22] Filed: Mar. 27, 1975

[21] Appl. No.: 562,866

Related U.S. Application Data
[62] Division of Ser. No. 447,855, March 4, 1974, Pat. No. 3,893,459.

[52] U.S. Cl. ............................ 128/191 R; 128/146.6
[51] Int. Cl.² ............................................. A62B 7/08
[58] Field of Search ........ 128/191 R, 195, 201–203, 128/205, 146, 146.3–146.7, 142, 142.4, 145 R, 145.6, 145.7, 145.8, 140 R

[56] References Cited
UNITED STATES PATENTS

| | | | |
|---|---|---|---|
| 1,983,475 | 12/1934 | Lemoine | 128/191 R |
| 1,999,086 | 4/1935 | Claudius | 128/191 R |
| 2,507,450 | 5/1950 | Millikan et al. | 128/203 |
| 3,208,449 | 9/1965 | Bartlett, Jr. | 128/203 |
| 3,530,857 | 9/1970 | Miczka | 128/145.8 |

*Primary Examiner*—Robert W. Michell
*Assistant Examiner*—Henry J. Recla
*Attorney, Agent, or Firm*—Brown, Murray, Flick & Peckham

[57] ABSTRACT

A mask is provided with a breathing opening, directly in front of the outer end of which there is a chemical cartridge that is secured to the mask. The cartridge has an exhalation passage extending through it from front to back, with its rear end registering with the breathing opening. A check valve in the inhalation passage allows air flow only into the mask. In the exhalation passage there is a carbon dioxide removing and oxygen generating chemical. A breathing bag is supported by the cartridge and communicates with the front end of the exhalation passage. The mask is provided with an inhalation check valve allowing air being inhaled from the bag to bypass the chemical.

2 Claims, 4 Drawing Figures

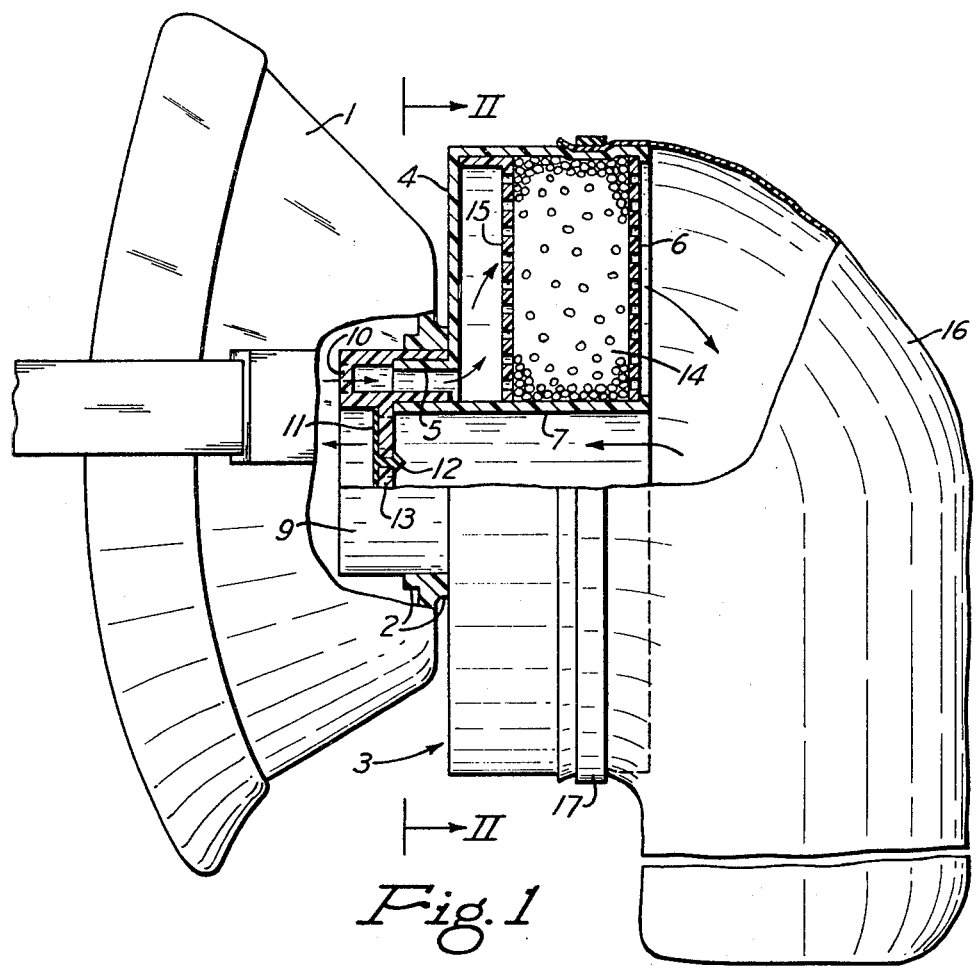
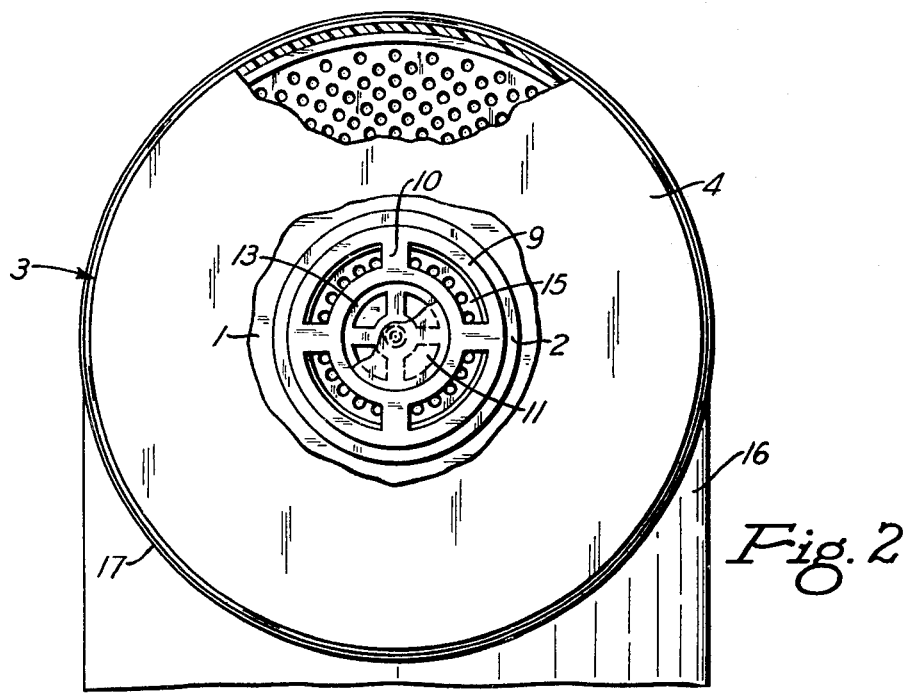

EMERGENCY BREATHING APPARATUS

This application is a division of our copending patent application, Ser. No. 447,855, filed Mar. 4, 1974 now U.S. Pat. No. 3,893,459.

Innumerable forms of breathing apparatus have been proposed. Some merely filter the air being breathed while others provide oxygen for the wearer of the apparatus. In closed cycle breathing apparatus, the user exhales through a chemical that removes carbon dioxide and generates oxygen that is then inhaled. Usually, such apparatus is intended for a relatively long period of use and therefore is rather large and cumbersome.

It is among the objects of this invention to provide closed cycle breathing apparatus for very short term emergency use, which is simple in construction, very compact, of minimal size and weight, and inexpensive.

The invention is illustrated in the accompanying drawings, in which

FIG. 1 is a side view, partly in vertical section;

FIG. 2 is a rear view taken on the line II—II of FIG. 1;

Figure 3:
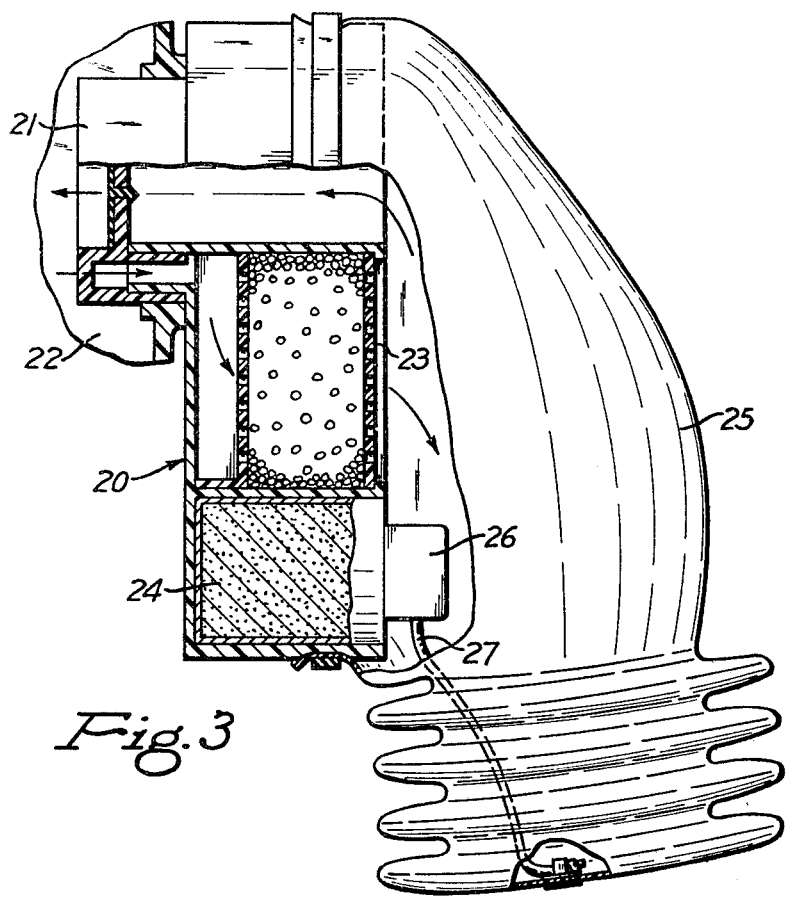
FIG. 3 is a fragmentary side view, similar to FIG. 1, of a modification.

Referring to FIGS. 1 and 2 of the drawings, a breathing mask 1 that may cover the entire face, but which preferably covers only the nose and mouth, is provided with a breathing opening that will generally be circular and the wall of which may be reinforced by providing it with inner and outer integral circular ribs 2. This opening is in the front side of the mask in most cases, although if two openings are provided they will be at opposite sides of the center of the mask. Plugged into the breathing opening is a chemical cartridge 3, which is shown cylindrical although it could be some other shape. The flat inner or rear wall 4 of the cartridge housing is solid, except for a central opening encircled by a rearwardly projecting flange 5 integral with the wall. The outer or front wall 6 is provided with a multitude of perforations and with a central opening coaxial with the opening in the rear wall but of smaller diameter. Rigidly mounted in this front opening is the front or outer end of a short tube 7 that extends back through the rear opening, with its rear end encircled by flange 5 that is spaced from the tube.

Mounted tightly on the flange and the rear end of the tube is a tubular boss 9 provided with a pair of concentric walls that are spaced apart but are rigidly connected at their rear ends inside the mask by integral radial struts 10. The outer wall of the boss encircles and tightly engages housing flange 5 to form tubular means, while the inner wall of the boss incircles and tightly engages the adjoining end portion of tube 7. The outer wall also tightly engages the encircling wall of the mask opening and forms a seal with it. This boss supports the cartridge housing close to or engaging the outer rib 2. The boss is secured to flange 5 and tube 7 and forms part of the cartridge. Disposed inside boss 9 behind tube 7 there is an inhalation check valve of any suitable construction, such as a flexible disc 11 provided with a central stem 12 extending forward through a hole in a spider 13 rigidly mounted in the boss. Such a valve will allow inhalation through the tube but prevent exhalation through it. Exhalation must therefore take place through the space between the two walls of the boss.

The cartridge housing contains a bed 14 of a chemical that will remove carbon dioxide from the breath and, due to the reaction of moisture in the breath with the chemical, generate oxygen. Such chemicals are well known and need not be described, potassium superoxide, sodium superoxide and calcium superoxide being some of them. The chemical bed is packed between the perforated front wall 6 of the cartridge and a perforated partition wall 15 encircling the central tube and parallel to the rear wall of the cartridge, but spaced a short distance in front of it. The space between these two walls permits air being exhaled into the cartridge to spread out over the rear surface of the chemical bed for uniform flow through it.

Another feature of this invention is that the front end of the cartridge extends into an opening in the back side of the upper part of a breathing bag 16. The wall of the bag opening is sealed against the side wall of the cartridge by means of a removable clamping band, such as an elastic band 17, that presses the bag against the cartridge. The cartridge forms the sole support for the bag and is in turn supported solely by the mask.

It will be seen that when the wearer of this apparatus exhales, it will be through the passage containing the chemical and therefore carbon dioxide will be removed and oxygen will be added. This rejuvenated air leaving the perforated front wall of the cartridge will enter the bag. During inhalation the purified air from the bag will be drawn through the central tube 7 of the cartridge and through the check valve and into the mask. It has been found that this apparatus will quickly start to produce oxygen, even when used in a temperature as low as minus 20°F. This is because of the close proximity of the chemical bed to the warm moist breath of the user, due to the fact that the cartridge is supported by the mask itself directly in front of the mask. The apparatus is small, lightweight and compact so that it is easy to carry. After it has been used, the cartridge can quickly be removed from the mask and bag, the boss 9 of a new cartridge inserted in the mask opening, and the bag connected to the front of the new cartridge by means of the clamping band 17. A cartridge of the size shown in the drawings will sustain the wearer of the apparatus for about five minutes, which should give him time in most cases to reach a safe breathing location.

Figure 4:
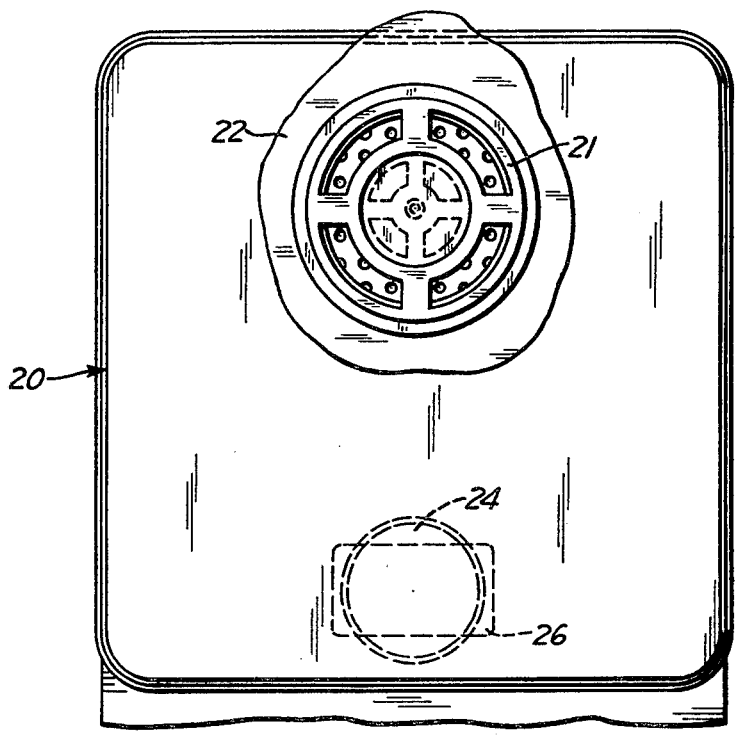
FIG. 4 is a rear view, similar to FIG. 2 of the modification.

In the modification shown in FIGS. 3 and 4, a square chemical cartridge 20 is shown and the boss 21 that contains the rear ends of the inhalation and exhalation passages is located nearer the top of the cartridge than its bottom. As before, the boss is plugged into a breathing mask 22. Mounted in the lower part of the cartridge and extending through its perforated front wall 23 is a chlorate candle 24 that can be ignited inside the bag 25 by igniter 26 of conventional form operated by pulling a lanyard 27. The upper end of this lanyard is connected to the igniter and the other end is attached to the bottom of the bag. After the apparatus has been put on by the user, he pulls down on the bottom of the bag, which causes the lanyard to trip the igniter so that the candle will immediately start to produce oxygen. Such a candle is needed only when it is expected that the apparatus will be used below about minus 20°F.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. Emergency breathing apparatus comprising a mask having an open inner side and a closed outer side and provided with a breathing opening in said outer side, a chemical cartridge outside the mask provided with a side wall and with a rear wall having an opening therein surrounded by tubular means extending into said breathing opening and tightly engaging the surrounding mask for supporting the cartridge therefrom, said tubular means being formed from a tubular flange and a tubular boss having an outer wall, said outer wall and flange being disposed in tight overlapping engagement with each other, the flange extending from the rear wall of the cartridge into said breathing opening, a breathing bag provided with an opening receiving said cartridge, the bag being sealed to the side wall of the cartridge, the cartridge having an inhalation passage therethrough connecting the inside of the bag with said breathing opening, said passage having a side wall spaced radially inwardly from said cartridge side wall, the inside of the cartridge around the inhalation passage forming an exhalation passage provided with an inlet adjacent the inner end of the inhalation passage and with an outlet inside the bag, said boss having an inner wall inside its outer wall and spaced therefrom to form part of the exhalation passage, the side wall of the inhalation passage including said inner wall of the boss and a tube extending through the cartridge and tightly engaging said inner wall, a check valve in said inhalation passage preventing exhalation through that passage, and a carbon dioxide removing and oxygen generating chemical in said exhalation passage and extending across the space between the side walls of the inhalation passage and cartridge in the path of air exhaled through the cartridge.

2. Emergency breathing apparatus according to claim 1, in which said check valve is disposed in said boss.

* * * * *